(No Model.) 3 Sheets—Sheet 1.
M. M. ZELLERS & A. G. WILKINS.
HAND MACHINE FOR ATTACHING BUTTONS.
No. 284,159. Patented Aug. 28, 1883.
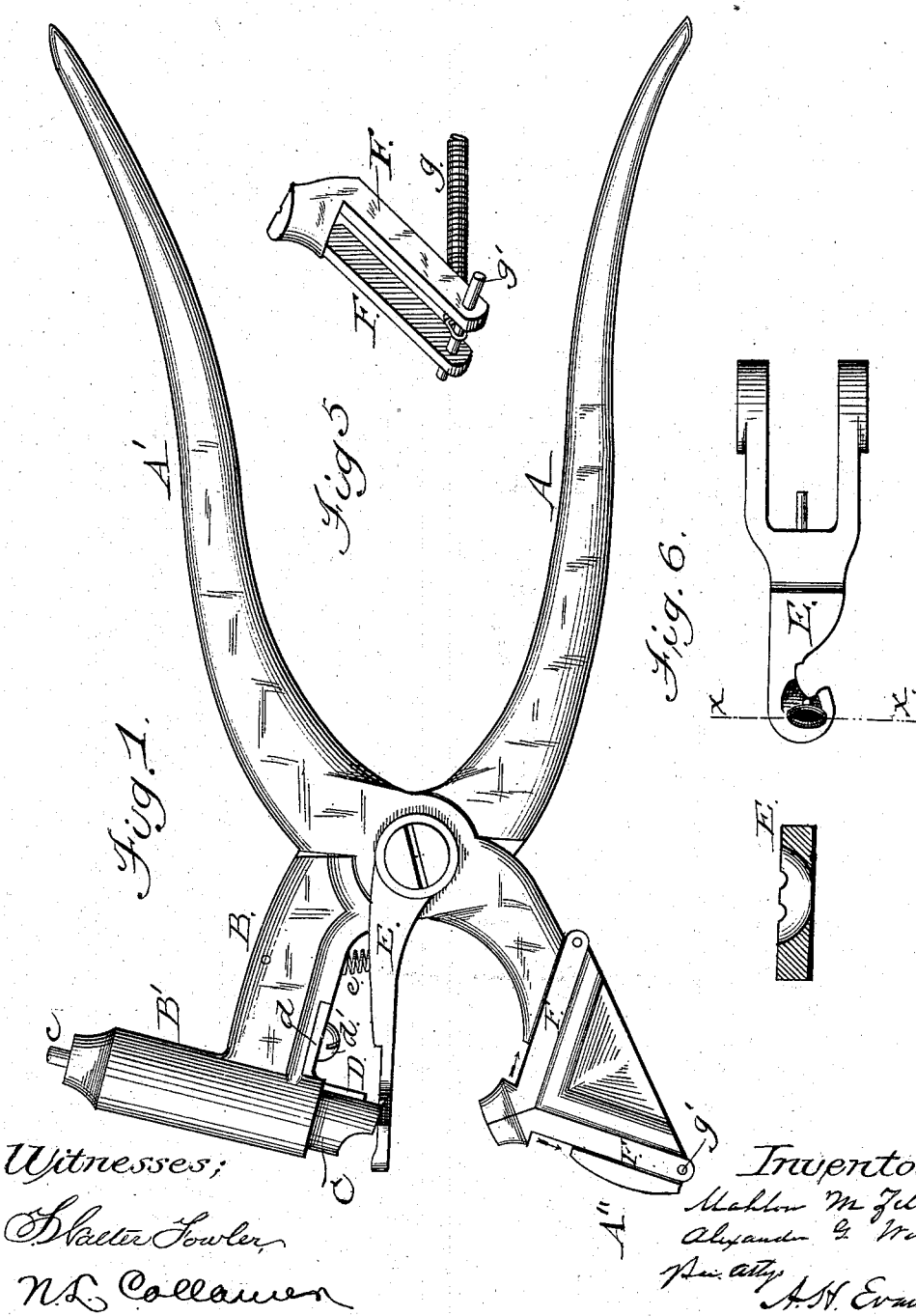

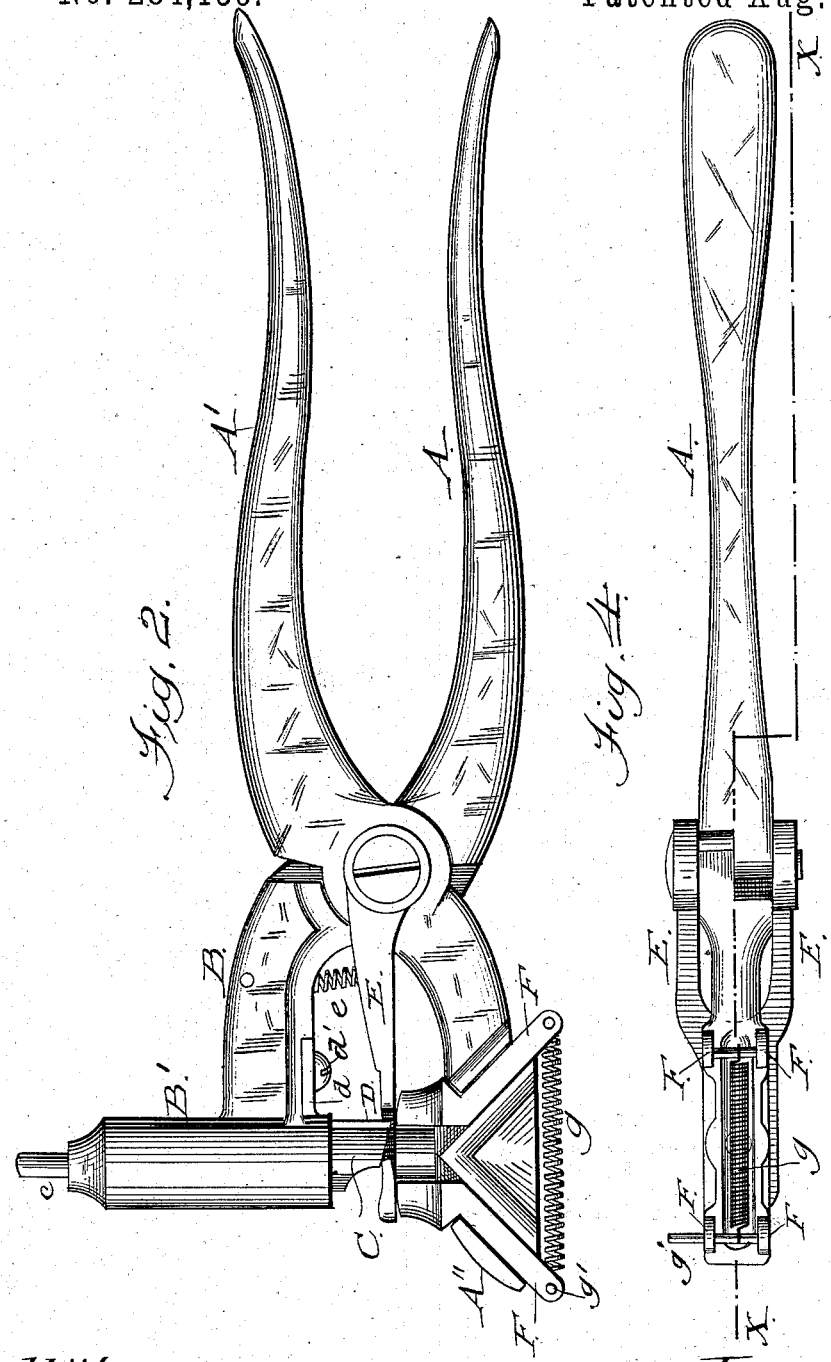

(No Model.) 3 Sheets—Sheet 3.
M. M. ZELLERS & A. G. WILKINS.
HAND MACHINE FOR ATTACHING BUTTONS.
No. 284,159. Patented Aug. 28, 1883.
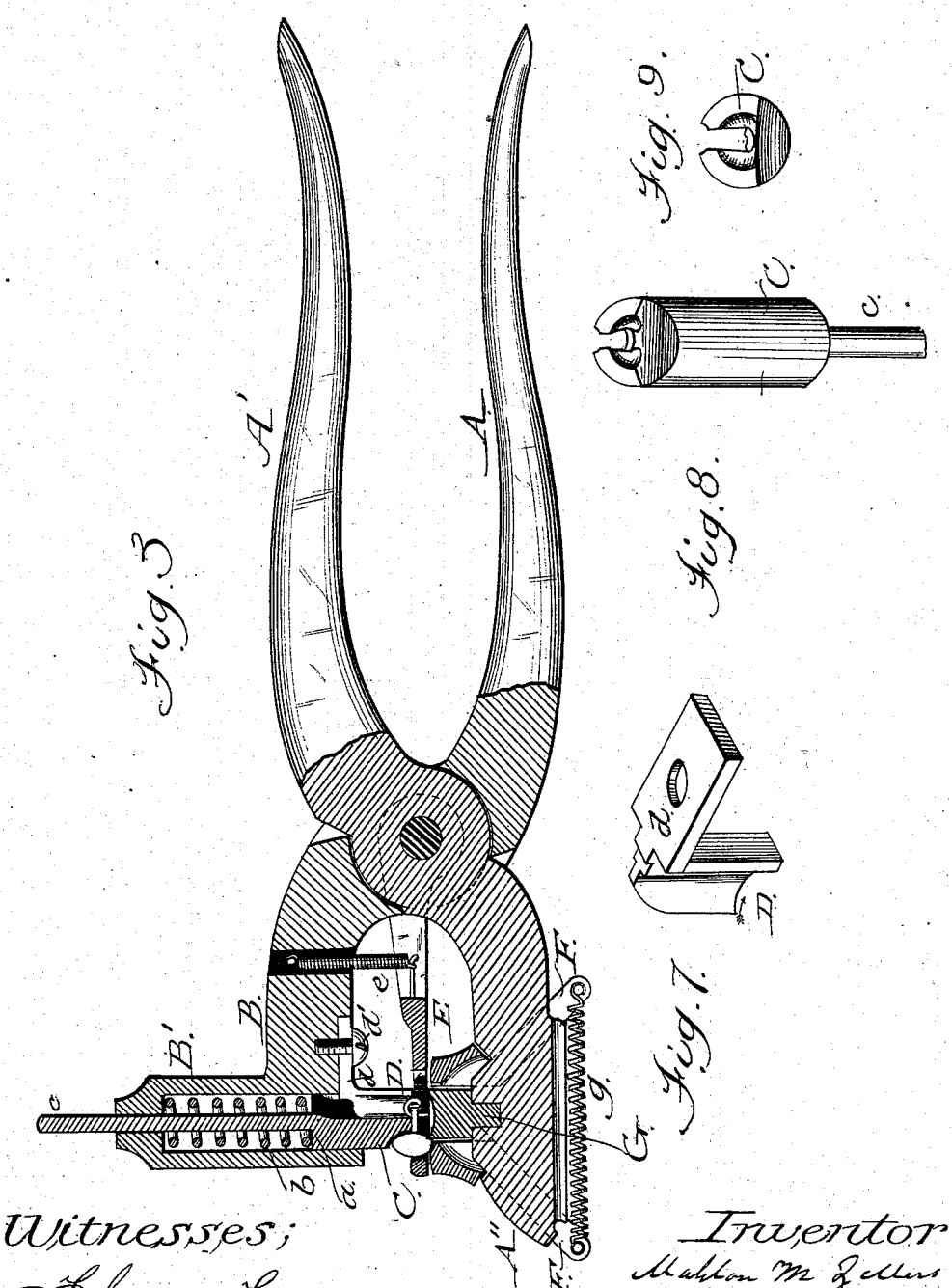

UNITED STATES PATENT OFFICE.

MAHLON M. ZELLERS, OF KENT, OHIO, AND ALEXANDER G. WILKINS, OF MEADVILLE, PENNSYLVANIA, ASSIGNORS TO THE WILKINS SHOE-BUTTON FASTENER COMPANY, OF MEADVILLE, PENNSYLVANIA.

HAND-MACHINE FOR ATTACHING BUTTONS.

SPECIFICATION forming part of Letters Patent No. 284,159, dated August 28, 1883.

Application filed July 7, 1883. (No model.)

*To all whom it may concern:*

Be it known that we, MAHLON M. ZELLERS, of Kent, in the county of Portage, State of Ohio, and ALEXANDER G. WILKINS, of Meadville, in the county of Crawford, State of Pennsylvania, have invented a new and useful Improvement in Machines for Attaching Buttons to Shoes, of which the following is a full, clear, and exact description, reference being had to the accompanying drawings, making a part of this specification, in which—

Figure 1 is a side elevation of my machine with the jaws open. Fig. 2 is the same with jaws closed. Fig. 3 is a longitudinal section. Fig. 4 is a plan view of the under side of the machine. Fig. 5 is a detached view of the sliding jaws. Fig. 6 is a detached view of the button-holding plate. Fig. 7 is a detached view of the former. Fig. 8 is a detached view of the plunger. Fig. 9 is the face of the plunger.

Our invention relates to that class of machines designed to fasten buttons to shoes by means of metallic hooks; and it consists of the combination of devices hereinafter explained and claimed.

To enable others skilled in the art to make and use our invention, we will proceed to describe the exact manner in which we have carried it out.

In the drawings, A A represent two pivoted lever-arms, carrying upon their short ends the necessary mechanism for carrying out the purpose of the invention. On the outer end of the upper short arm, B, rises the hollow cylindrical casing B', in which is fitted the plunger C, the stem $c$ of which has a free play through the top of the casing as the plunger is forced up or down. Within the top of the casing, and resting upon the shoulder $a$, is placed the coiled spring $b$, which fits snugly against the top of the chamber in the casing, as shown in Fig. 3. It is evident from this construction that when the plunger C is pressed up in the chamber of the casing while the jaws of the machine are pressed together, that as soon as the pressure is relieved the spring $b$ will again throw out the plunger to its normal position. On the inner side of the plunger C is a groove to receive a former, D, which is attached to the under side of the short arm B' by means of the arm $d$ and screw $d'$. Thus when the jaws come in contact and the plunger C is forced upward the former D, being rigidly attached to the arm B, will continue to descend with the arm until it has discharged its office, as will be hereinafter explained. The former D is provided with a curved face, as shown in Fig. 7, and as it descends on the point of the metallic pin the point of the pin is bent in the direction of the arrow until it is completely looped in the eye of the button, as shown in Fig. 3. The lower face of the plunger is grooved, as shown in Figs. 8 and 9, to fit over the eye of the button and hold it firmly in position while the former does its work in looping the metallic fastener in the eye of the button, the eye itself constituting the mandrel on which the looping is done, which is an essential feature of our present invention.

Pivoted between the short arms of the levers is the plate E, slotted at its free end, as shown in Fig. 6, to receive the button and allow the eye to lie laterally under the plunger, as more particularly shown in Fig. 3. The plate E is connected to the arm B by means of the coiled spring $e$, by which means the plate is held against the lower face of the plunger, where it clasps and holds the button and eye ready for the pin and former.

The short arm A'' of the lever A' is grooved to receive the sliding pin and washer-holders F F. The upper portion of these holders, when in their normal position, form an inverted cup-shaped receptacle for the washer and pin, and the pin is held in a vertical position while it is passed through the eye of the button, and, until the plunger descends, receives the point of the pin, and by pressing down upon the plate E forces the holders F F back out of the way, as shown in Fig. 3, until the former has completed the loop of the pin in the eye of the button, the washer and head of the pin resting upon the anvil G, inclosed by the holders F when in their normal position. The pressure being taken from the holders F F, they are again forced into their normal position by the coiled spring $g$, which connects together the lower part of the sliding holders F F, and by contraction again force the top of the holders together, as shown in Fig. 1.

The operation of our machine is as follows:

The outer leg of the holder is forced down by placing the finger against the pin $g'$, (see Fig. 4,) where a washer is placed in position on the anvil G, and the leg of the holder, being released, returns to its position, and the pin, with the washer, is firmly held in position to secure the eye of the button. The plate E is then brought down sufficiently to allow the button to be placed in position between the plate and the holder. Everything now being ready, the machine is applied to the spot on the shoe where it is intended to fasten the button, and the lever-arms A A' pressed together. The operation is complete and the button is secured in position.

Having thus explained our invention, what we claim as new, and desire to secure by Letters Patent, is—

1. In a machine for attaching buttons to shoes, the lever-arms A A', with their short arms B A'', in combination with the plunger C, former D, plate E, and holders F F, all constructed to operate substantially as and for the purpose set forth.

2. In a machine for attaching buttons to shoes, the plunger C and former D, in combination with the plate E and holders F F, all constructed to operate substantially as and for the purpose set forth.

MAHLON M. ZELLERS.
ALEXANDER G. WILKINS.

Witnesses:
 ROBT. REED,
 F. L. ALLEN.